UNITED STATES PATENT OFFICE.

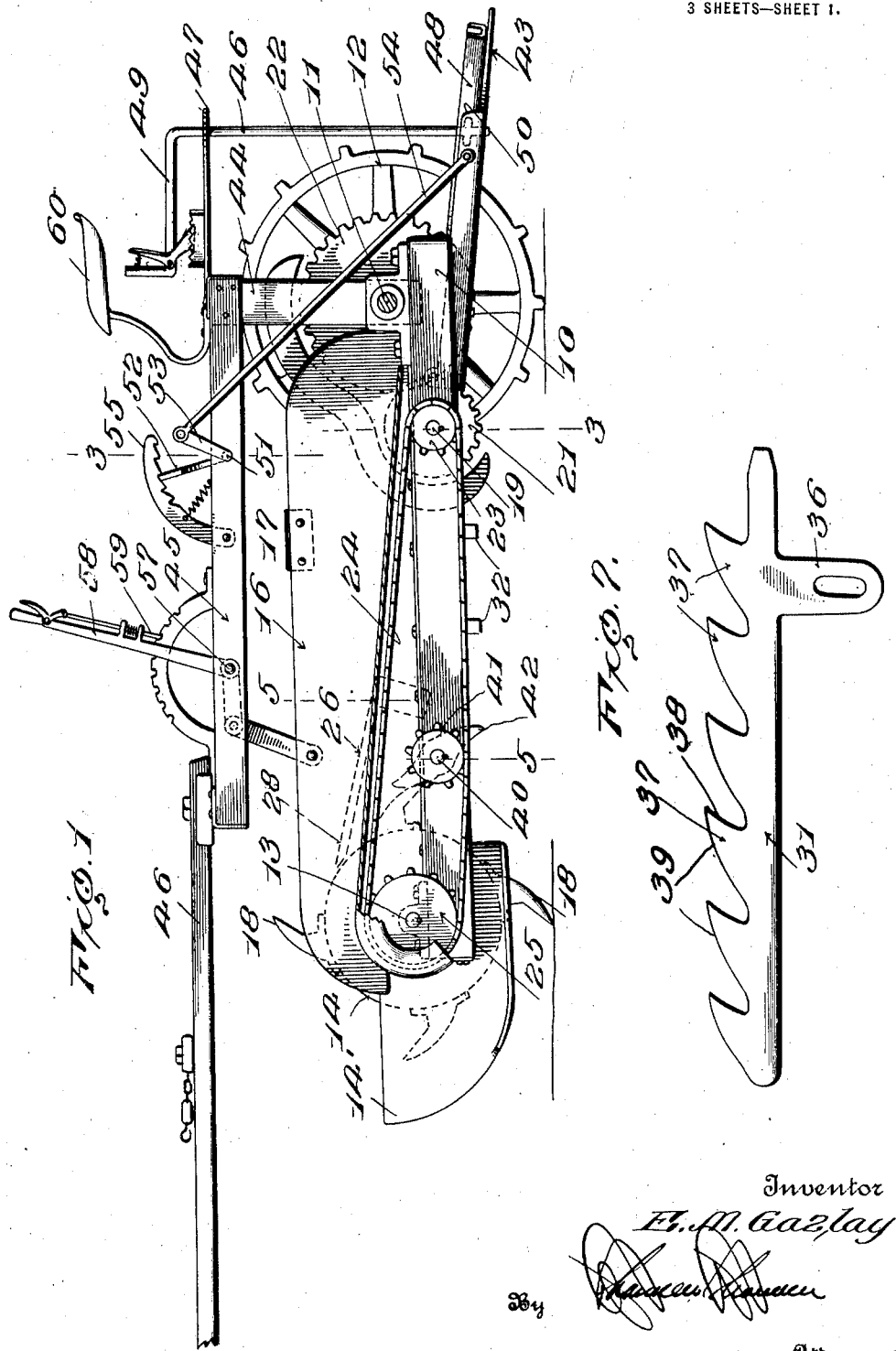

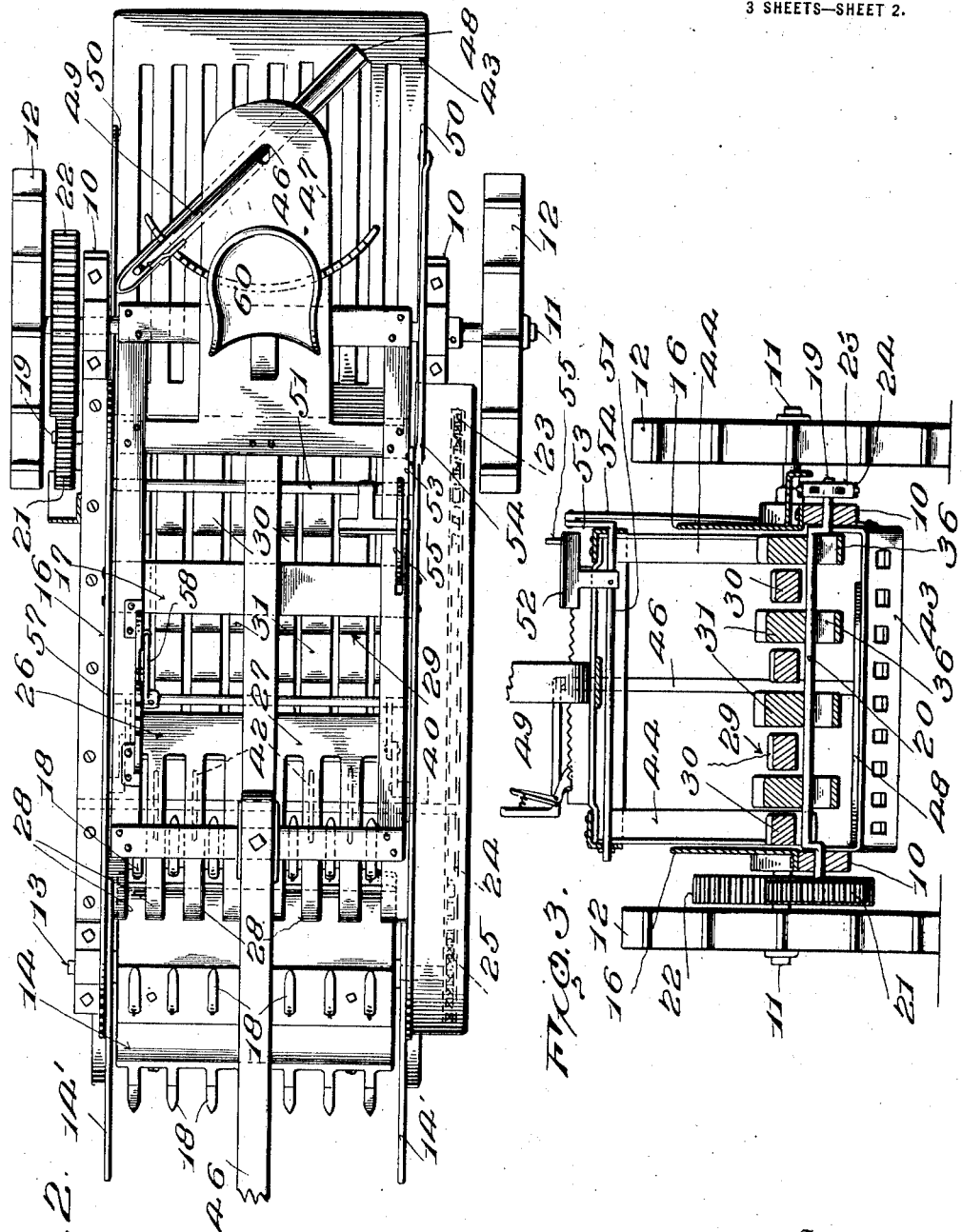

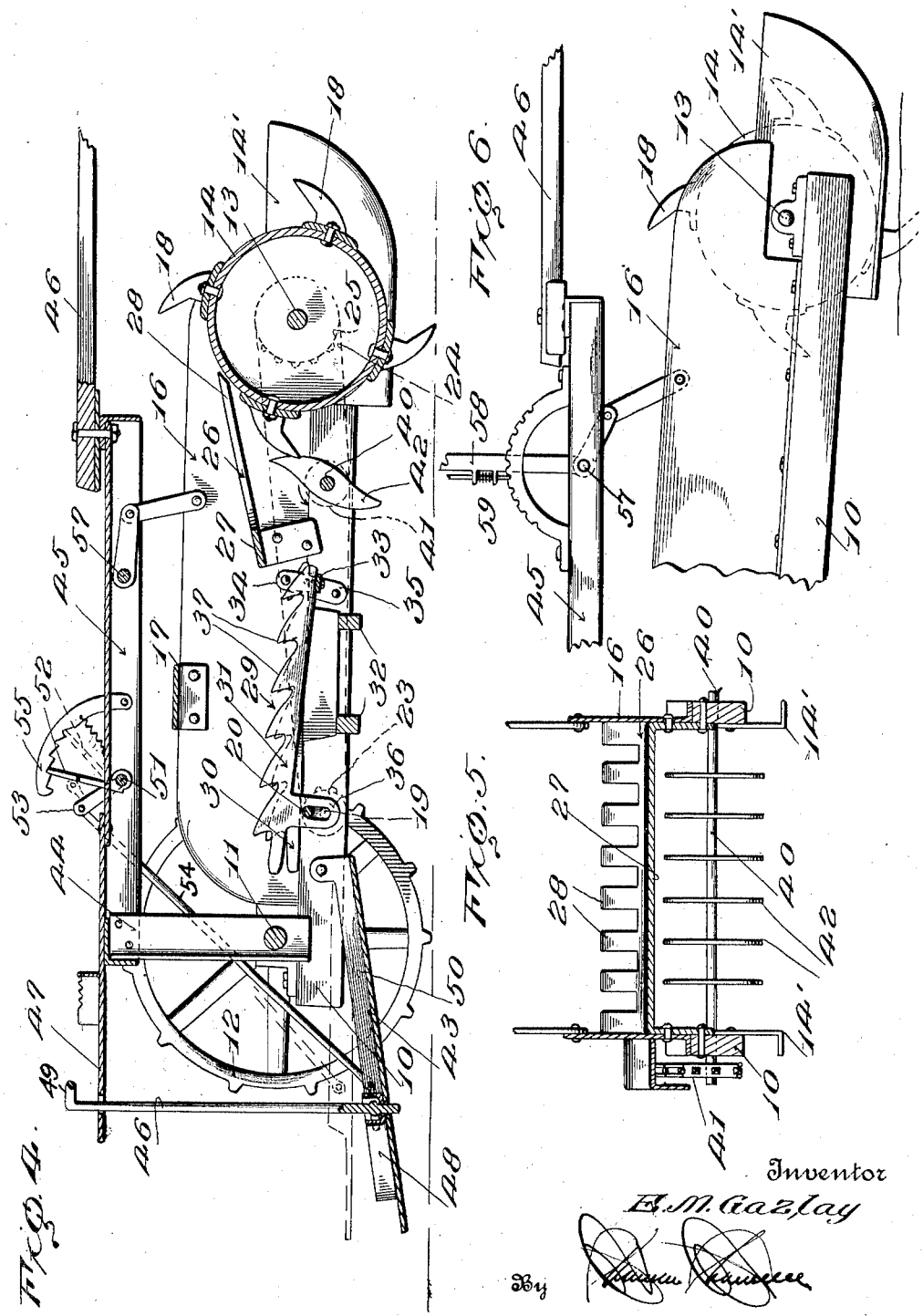

EUGENE M. GAZLAY, OF SIDNAW, MICHIGAN.

POTATO-DIGGER.

1,334,605.  Specification of Letters Patent.  Patented Mar. 23, 1920.

Application filed May 3, 1919. Serial No. 294,548.

*To all whom it may concern:*

Be it known that I, EUGENE M. GAZLAY, a citizen of the United States, residing at Sidnaw, in the county of Houghton, State of Michigan, have invented certain new and useful Improvements in Potato-Diggers; and I do hereby declare the following to be a full, clear, and exact description of the invention, such as will enable others skilled in the art to which it appertains to make and use the same.

This invention relates to farm machinery and more particularly to potato diggers and has for its object to provide a machine which may be operated to dig potatoes from the ground, and which will deliver the potatoes so dug at the rear of the machine.

Another object is to provide means for delivering potatoes at either side of the machine as desired, and a further object is to provide a machine in which the depth of excavation may be regulated.

In the drawing:

Figure 1 is a side elevation of the present invention showing the drum driving side of the machine.

Fig. 2 is a top plan with the deflector disposed to deliver at one side of the machine.

Fig. 3 is a transverse section on line 3—3 of Fig. 1, taken in the plane of the conveyer shaft and the apron controlling shaft.

Fig. 4 is a central longitudinal section through the structure shown in Fig. 2 looking toward the drum driving side of the machine, showing the apron lowered and illustrating it elevated in dotted lines.

Fig. 5 is a transverse section on line 5—5 of Fig. 1 taken in the plane of the beater shaft and extending through the mounting of the scraper comb.

Fig. 6 is a view showing a portion of the opposite side of the machine from Fig. 1 to illustrate the means for varying the depth of cut.

Fig. 7 is a detailed elevational view of one of the movable elements of the conveyer mechanism.

Referring now to the drawings, the present invention has a base frame consisting of a pair of longitudinal spaced parallel sills 10 which have journaled thereupon at their rearward ends the transverse shaft 11 which projects at its ends beyond the sills and carries upon its ends a pair of bull wheels 12.

Journaled upon the sills at their forward ends there is a transverse shaft 13 which carries a drum 14 located between the forward ends of the sills and secured to the inner faces of the sills there are a pair of guard plates 14' which extend forwardly beyond the drum and which also extend downwardly below the sills whereby they have laterally turned edge portions which may engage the surface of the ground as will be understood.

Secured to the upper edges of the sills 10 there are side plates 16 which are connected by a transverse base member 17 secured thereto at their upper edges.

As illustrated, the drum 14 has bolted thereto a plurality of excavating arms 18 which are arranged in circumferentially spaced longitudinal series, and the arms of each series are spaced from each other as illustrated.

Journaled in the sills 10 adjacent to the rearward ends thereof there is a transverse shaft 19 having a crank portion 20 located between the sills. One end of this shaft 19 carries a gear 21 which meshes with the gear 22 carried by the shaft 11, while the other end of the shaft 19 carries a sprocket wheel 23 with which there is engaged a sprocket chain 24, this chain being also engaged with the sprocket wheel 25 carried by the shaft 13. Thus it will be seen that rotation of the bull wheels 12 will result in the turning of the shaft 19 and the shaft 13, the latter revolving the drum 14.

Mounted rearwardly of the drum 14 there is a scraper comb 26 which consists of a transverse bar 27 secured at its ends to the side plates 16 and having secured thereto a plurality of forwardly extending arms 28 which are disposed in spaced relation to each other and which are so located that the excavating arms 18 will pass therebetween during rotation of the drum 14.

Located rearwardly of the scraper comb 26 there is a conveyer 29. This conveyer consists of a plurality of longitudinally arranged spaced stationary members 30, and a plurality of similarly arranged movable members 31, the latter being located in the spaces between the members 30. The members 30 are secured upon a pair of transverse supports 32 carried by the sills 10 while the members 31 are supported at their forward ends upon a hanger plate 33 having upturned ends 34 which are pivoted to the upper ends of rock arms 35, the lower ends of these rock arms being pivoted to the sills 10 as illustrated.

The rearward ends of the members 31 are provided with depending vertically slotted brackets 36 which receive the crank portion 20 of the shaft 19 within their slots. The construction of the conveyer is such that when the shaft 19 is revolved, the members 31 will be moved upwardly and rearwardly and then downwardly and forwardly being projected above the upper surfaces of the members 30 during their rearward movement and carried below the upper surfaces of the members 30 during their forward movement. The upper surfaces of both the members 30 and 31 are provided with upwardly extending teeth 37, these teeth having vertical rearward faces 38 and diagonal forward faces 39. It will thus be seen that any matter deposited upon the conveyer will be carried rearwardly by the rearward movement of the members 31 and will be held against forward movement with these members by the teeth 37 of the members 30.

Mounted transversely in the sills 10 between the drum 14 and the conveyer 29 there is a transverse beater shaft 40 having a sprocket wheel 41 at one end which is engaged by the sprocket chain 24. This beater shaft carries a plurality of oppositely extending arms 42 which are so located as to work between the excavating arms 18 as the drum 14 is revolved thus removing from the excavating arms any matter that may adhere thereto. The beater arms are also so arranged and so disposed that such matter as is removed from the arms 18 will be thrown upon the forward end of the conveyer 29.

Located rearwardly of the conveyer 29 and in a position to receive therefrom, there is a rearwardly extending apron 43 connected at its forward end with the sills 10 for vertical pivotal movement of the apron.

Mounted upon the shaft 11 there are a pair of upwardly extending supports 44 which, at their upper ends, carry the rearward end of a forwardly extending top frame 45. This top frame has a draft tongue 46 secured to its forward end and it is by means of this tongue that the mechanism is drawn over the ground when in use. From the structure already described it will be seen that when the mechanism is in use, rotation of the wheels 12 through engagement with the ground will revolve the drum 14, and the arms 18 will be projected into the ground at the rearward side of the drum and brought out by the ground at the forward side of the drum. Vines with potatoes clinging thereto will be lifted by the arms and will be deposited upon the scraper comb 26 from which they will pass to the conveyer 29 and thence to the apron 43. Any vines which are carried beyond the scraper comb by the arms 18 will be disengaged from the arms 18 by the beater arms 42 and will be thrown upon the conveyer.

To direct the potatoes to one side of the road as the machine passes over the ground, there is provided a deflector which includes a shaft 46 journaled at its lower end in the apron 43 and at its upper end in a rearwardly extending plate 47 carried by the top frame 45. This shaft carries a deflector arm 48 which lies just above the apron and which extends oppositely beyond the shaft. The upper end of the shaft carries a crank 49 by which the shaft may be moved to shift the deflector member 48 so as to direct its rearward end at times diagonally toward one side of the apron and diagonally at times toward the other side of the apron, the forward end of the deflector member being arranged for engagement with either of the upstanding side portions 50 of the apron as illustrated.

Mounted transversely in the top frame 45 there is a shaft 51 which carries a foot pedal 52 by means of which the shaft may be rocked and at one end the shaft 51 carries a crank arm 53 to which there is pivoted a downwardly extending link 54 pivoted at its lower end to the apron 43. Thus movement of the shaft 51 will result in raising or lowering of the apron. A rack bar 55 is pivoted to the top frame 45 for movement into and out of engagement with the pedal 52 to hold this pedal and the shaft 51 with the apron 43 at different elevations. The shaft 46 is free to slide vertically through the plate 47 as the apron is raised and lowered.

A transverse rock shaft 57 is mounted in the top frame 45 and is connected with one of the side plates 16 for vertical movement of these side plates and therewith the lower portion of the machine when the shaft is rocked, and a lever 58 is carried by the shaft 57 for movement thereof, a rack and dog mechanism 59 being provided to hold the shaft 57 at different points of its rocking movement and thus control the elevations of the lower portion of the machine and the depth of cut of the excavating arms 18 as will be readily understood.

A suitable seat 60 is mounted upon the top frame as illustrated and is so disposed that its occupant may reach the pedal 52 with one foot and may also reach the lever 58 and the crank 49 with his hands.

What is claimed is:

1. A machine of the class described comprising a top frame, depending members carried by the rearward end of the top frame, a shaft journaled in the lower ends of the members, forwardly extending sills journaled upon the shaft, rotary excavating means revolubly mounted at the forward ends of the sills, a conveyer located between the sills rearwardly of the excavating means, means for conveying the excavated material from the excavating means to the conveyer, an apron located rearwardly of the conveyer and in a position to receive therefrom, said apron being mounted for vertical adjustment, means for holding the apron at different points of its vertical movement, a deflector mounted upon the apron and shiftable to direct the discharge of material from the apron at either side thereof, and means for shifting the forward portions of the sills vertically with respect to the top frame.

2. A mechanism of the class described comprising a frame, an excavator mounted in the frame, a vertically movable apron carried by the frame at the rearward end thereof, means for conveying material from the excavator to the apron, means for moving the apron vertically, a vertical shaft pivotally connected to the apron, a guide for the vertical shaft connected with the frame, said shaft being slidable vertically through the guide, a lateral arm carried by the shaft and a deflector member carried by the shaft and resting upon the apron, said deflector member being movable with the shaft to extend at times diagonally of the apron in one direction, and at times diagonally of the apron in the opposite direction.

3. A mechanism of the class described comprising a top frame, depending members carried by the rearward portion of the top frame, a transverse shaft journaled in the depending members, ground wheels carried by the shaft, forwardly extending sills carried by the shaft, upwardly extending side plates carried by the sills, a drum journaled between the forward ends of the sills, excavating arms carried by the drum, driving connections between the transverse shaft and the drum, an apron at the rearward end of the sills, means for carrying excavated material from the drum to the apron, a transverse rock shaft mounted in the top frame, connections between the rock shaft and the side plates for vertical movement of the side plates and therewith the sills with respect to the top frame when the shaft is rocked and means for rocking the shaft.

In testimony whereof, I affix my signature, in the presence of two witnesses.

EUGENE M. GAZLAY.

Witnesses:
JOSEPH A. JUTTNER,
ARNOL GAZLAY.